United States Patent [19]

Takahashi

[11] Patent Number: 5,065,325

[45] Date of Patent: Nov. 12, 1991

[54] DEVICE FOR DETERMINING MALFUNCTIONING OF ELECTRIC-MOTOR-ASSISTED POWER STEERING SYSTEM OF MOTOR VEHICLE

[75] Inventor: Tsutomu Takahashi, Tokyo, Japan

[73] Assignee: Fuji Jukogyo Kabushiki Kaisha, Tokyo, Japan

[21] Appl. No.: 556,371

[22] Filed: Jul. 23, 1990

[30] Foreign Application Priority Data

Jul. 28, 1989 [JP] Japan .................. 1-193908

[51] Int. Cl.$^5$ .............................. B62D 5/04
[52] U.S. Cl. .................. 364/424.05; 364/424.03; 180/79.1; 180/142
[58] Field of Search ...... 364/424.03, 424.04, 364/424.05; 180/79.1, 140, 141, 142, 143; 307/10.1, 10.7; 340/438, 459, 465

[56] References Cited

U.S. PATENT DOCUMENTS

| | | | |
|---|---|---|---|
| 4,720,791 | 1/1988 | Daido | 364/424.05 |
| 4,803,629 | 2/1989 | Noto et al. | 180/79.1 |
| 5,001,637 | 3/1991 | Shiraishi et al. | 180/142 |

FOREIGN PATENT DOCUMENTS 61-98670  5/1986  Japan .

Primary Examiner—Gary Chin
Attorney, Agent, or Firm—Beveridge, DeGrandi & Weilacher

[57] ABSTRACT

In an electric-motor-assisted power steering system of a motor vehicle, malfunctioning of a steering angle sensor is detected reliably even when the sensor generates an erroneous output signal of a moderate magnitude. When the vehicle speed is above a predetermined value, the steering force is below a predetermined value and the steering quantity is below a predetermined value and when such conditions continue to exist for a predetermined time, it is determined that the vehicle is driven straight ahead. If a detected steering angle is above a predetermined value even when the straight ahead condition of the vehicle is determined, an abnormality determining section produces an alarm output signal indicating that there is a malfunction.

5 Claims, 5 Drawing Sheets

DEVICE FOR DETERMINING MALFUNCTIONING OF ELECTRIC-MOTOR-ASSISTED POWER STEERING SYSTEM OF MOTOR VEHICLE

BACKGROUND OF THE INVENTION

The present invention relates to a device for determining a malfunctioning of an electric-motor-assisted power steering system of a motor vehicle.

An electric-motor-assisted power steering system is known and described in Japanese Patent Laid-Open Publication No. 61-98670. The known power steering system of this type has an assisting motor and a control circuit. The control circuit controls the rotational direction and the electric current of the motor to rotate the motor for assisting the steering operation of the steering system, on the basis of a sum of a first motor current command value in an assisting direction and of a second motor current command value in the opposite direction. The first current command value is produced in accordance with a steering torque generated by the steering wheel, and the second current command value is produced in accordance with the steering angle.

In the steering system of the above described type, the steering force required for increasing and decreasing the steering angle is reduced by the assisting motor. However, when there occurs a malfunctioning of a steering torque sensor or a steering angle sensor, the steering assisting force becomes excessively large so that it becomes impossible for the driver to maneuver the steering wheel as he wants.

The steering torque sensor has a substantially fixed operating range so that it is relatively easy to determine whether the steering torque is within the operating range. On the other hand, in the case of a steering angle sensor using a potentiometer, it is relatively easy to determine whether a malfunctioning thereof is due to damage of an electric wiring connected to the potentiometer, whereas it is considerably difficult to determine a malfunctioning of the steering angle sensor unless the sensor generates an erroneous output signal of an apparently abnormal magnitude.

SUMMARY OF THE INVENTION

It is therefore an object of the present invention to provide a device for determining a malfunctioning of an electric-motor-assisted power steering system of a motor vehicle, in which the determination of the malfunctioning becomes reliable even when the steering angle sensor generates an erroneous output of a moderate magnitude which is not abnormally large.

According to the present invention, there is provided a device for determining a malfunctioning of an electric-motor-assisted power steering system of a motor vehicle, having an electric motor drivingly coupled to the steering system, and control means responsive to a steering operation for controlling the motor so as to assist the operation of the steering system, said device comprising: a vehicle speed sensor for detecting vehicle speed, a steering force sensor for detecting steering force exerted by the steering operation, a steering angle sensor for detecting steering angle, speed determining means for producing an output signal when the vehicle speed is above a predetermined speed, steering force determining means for producing an output signal when the steering force is below a predetermined value, average steering angle calculating means for calculating an average steering angle in accordance with the steering angle and a last value of the average steering angle, steering quantity determining means for calculating a steering quantity on the basis of the difference between the average steering angle and the steering angle to produce an output signal when the steering quantity is below a predetermined quantity, condition determining means responsive to said output signals of the speed determining means, the steering force determining means and the steering quantity determining means for generating an output signal, time integrating means for producing an output signal indicating that the vehicle is driven straight ahead, when the output signal of the condition determining means has continued for a predetermined time, steering angle determining means for producing an output signal when the steering angle is above a predetermined angle, and abnormality determining means responsive to the output signals from the time integrating means and the steering angle determining means for producing an abnormality output signal.

The device according to the present invention is advantageous as described below. For example, an erroneous determination of the steering angle sensor being malfunctioning is avoided while a vehicle is making a turn at a corner by steering operation for a short time, since the abnormality of the steering angle sensor is determined in consideration of whether the steering quantity is below the predetermined value. Furthermore, an erroneous determination of the vehicle traveling straight ahead is avoided even when the steering quantity has become smaller than the predetermined quantity during a steady state turn, since the condition for determining a straight ahead vehicle drive includes a condition that the steering force is below a predetermined value.

A preferred embodiment of the present invention will become understood from the following detailed description referring to the accompanying drawings.

DESCRIPTION OF THE PREFERRED EMBODIMENT

Figure 1:
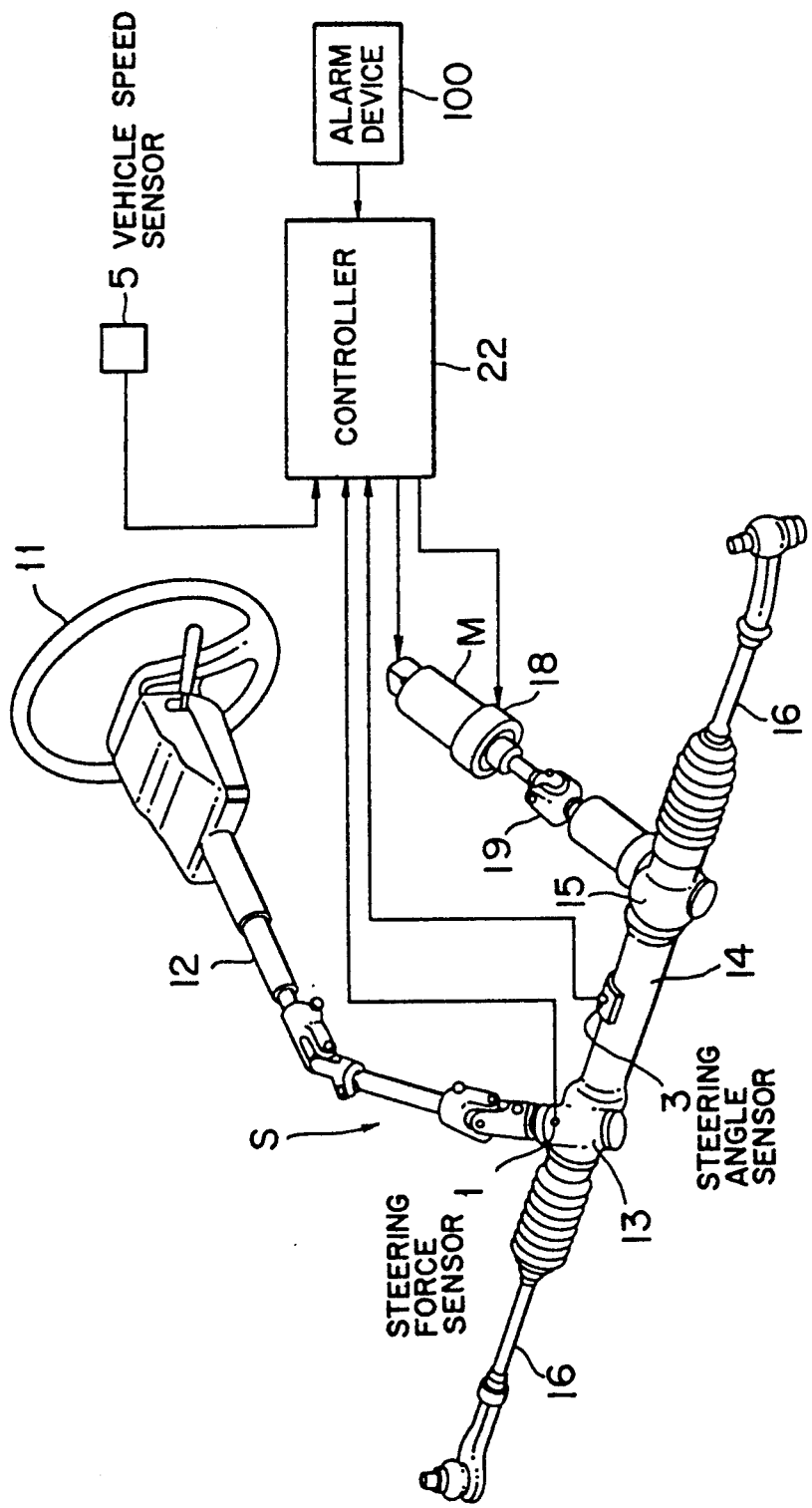
FIG. 1 is a perspective view showing an electric-motor-assisted power steering system.

Referring to FIG. 1, there is shown a rack-and-pinion type power steering system S having an assisting motor M. The steering system has a steering wheel 11, a steering shaft 12 and a steering gear box 13 housing a pinion (not shown). A tubular casing 14 has therein a rack (not shown) meshing with the pinion in the gear box 13.

Another gear box 15 has also therein a pinion (not shown) meshing with the rack in the casing 14. The motor M has a clutch device 18 selectively connecting a motor shaft (not shown) and an output shaft 19 connected to the pinion in the gear box 15 through a reduction gear device (not shown), whereby rotation of the output shaft 19 causes a shifting movement of the rack in the casing 14. The rack is coupled to front wheels of a vehicle via rods 16.

A steering force sensor 1 is provided on the gear box 13 for measuring the torsion torque and hence the steering force of the steering shaft 12. A steering angle sensor 3 is provided adjacent to the casing 14 so as to measure the axial movement of the rack corresponding to the steering angle of the steering wheel 11. Outputs of the sensors 1 and 3 are supplied to a controller 22. A vehicle speed sensor 5 also supplies a speed signal to the controller 22.

Figure 2:
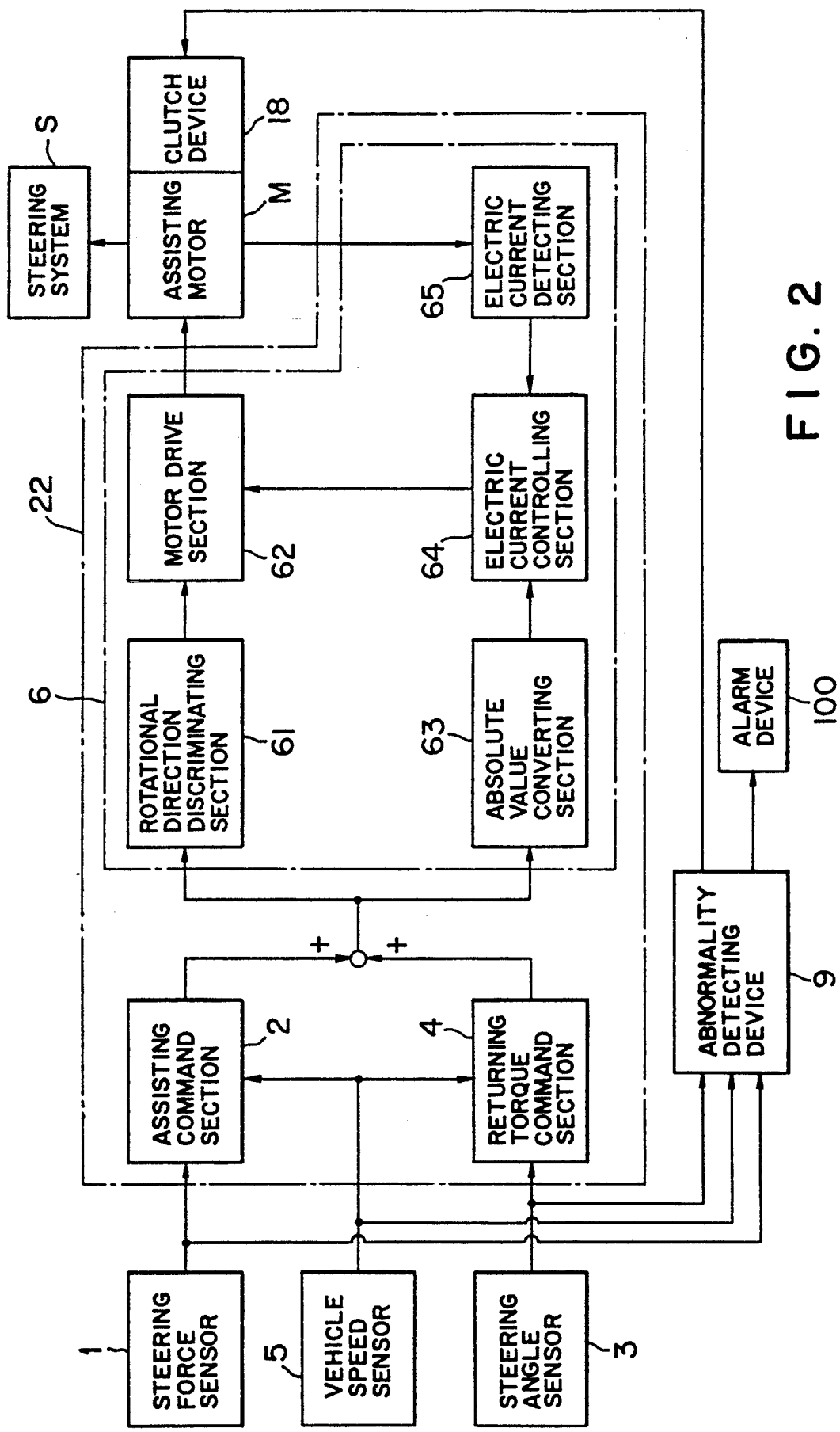
FIG. 2 is a block diagram of a controller for the steering system.

The controller 22 is shown in more detail in FIG. 2. The steering force sensor 1 delivers a steering force signal to an assisting command section 2. Responsive to the steering force signal, the assisting command section 2 calculates a value of a command electric current in an assisting direction for steering on the basis of a predetermined function. The steering angle sensor 3 delivers a steering angle signal to a returning torque command section 4, which calculates a value of a command electric current in a returning direction for steering. The command value in the returning direction is determined in accordance with the value of the steering angle signal.

The command value in the assisting direction calculated by the section 2 is added to the command value in the returning direction calculated by the command section 4 to obtain a total command value. The total command value is inputted to a control circuit 6, which determines a rotational direction and an electric current to turn the motor M so as to apply an assisting torque to the steering system.

The vehicle speed sensor 5 supplies a speed signal to the assisting command section 2 as well as to the returning torque command section 4. Responsive to the speed signal, the command values calculated in the two sections 2 and 4 are changed appropriately.

The control circuit 6 has a rotational direction discriminating section 61 for determining whether the total command value inputted to the section 61 is a positive value or a negative value. For example, if the positive value represents a right-handed direction, the negative value represents a left-handed direction. The control circuit 6 also has an absolute value converting section 63 for taking the absolute value of the total command value. The control circuit 6 further has a motor drive section 62, an electric current controlling section 64 and an electric current detecting section 65 for detecting the electric current flowing in the motor M. The absolute vale converting section 63 supplies an absolute value signal to the electric current control section 64. The section 64 compares the absolute value inputted from the section 63 with a value of the electric current inputted from the section 65 to produce an output control signal proportional to the difference between the two compared values. The output control signal from the controlling section 64 is supplied to the motor drive section 62. An output signal of the rotational direction discriminating section 61 is supplied also to the motor drive section 62. Responsive to the signals from the controlling section 64 and the rotational direction discriminating section 61, the motor drive section 62 delivers an output signal to the motor M for controllingly operate the motor in a direction determined by the section 62.

An abnormality detecting device 9 is provided as shown in FIG. 2. The detecting device 9 detects abnormality in the steering angle sensor 3. The abnormality is a malfunctioning of the sensor 3, which has a serious influence on the steering power assisting control for an electric-motor-assisted steering system.

Figure 3:
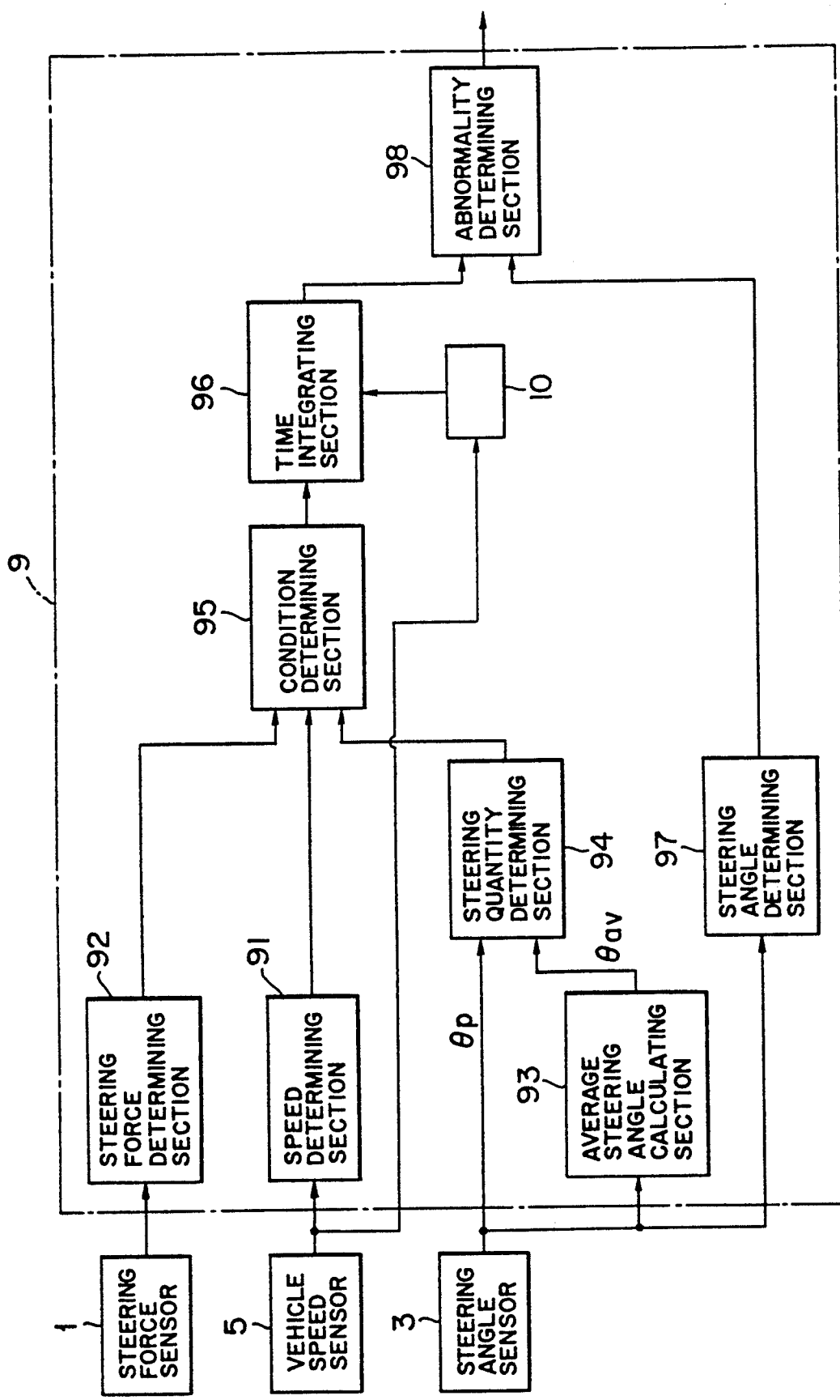
FIG. 3 is a block diagram showing in detail an abnormality detecting device illustrated in FIG. 2.

The abnormality detecting device 9 is shown in detail in FIG. 3. The vehicle speed signal from the vehicle speed sensor 5 is supplied to a speed determining section 91 for determining whether the detected vehicle speed is above a predetermined vehicle speed Vth (for example, approximately 20 km/hour). When the detected vehicle speed exceeds Vth, the speed determining section 91 produces an output signal.

The steering force signal from the steering force sensor 1 is supplied to a steering force determining section 92 for determining whether the detected steering force is below a predetermined steering force Tth (for example, approximately 1 kg.f). When the detected steering force is below Tth, the steering force determining section 92 produces an output signal.

The abnormality detecting device 9 has an average steering angle calculating section 93. The steering angle sensor 3 detects the steering angle $\theta p(n)$ at each sampling time. The calculating section 93 calculates an average steering angle $\theta av(n)$ from a present steering angle $\theta p(n)$ and from an average steering angle $\theta av(n-1)$ calculated one sampling time period ago, on the basis of the equation below:

$$\theta av(n) = \theta av(n-1) + \frac{\theta p(n) - \theta av(n-1)}{K} \quad (1)$$

where K is a constant representing a ratio of a time constant to the sampling time period and is set, for example, 30.

A signal of the average steering angle $\theta av(n)$ calculated by the calculating section 93 is inputted to a steering quantity determining section 94. A signal of the present steering angle $\theta p$ is also inputted to the determining section 94 from the steering angle sensor 3. The steering quantity determining section 94 calculates the steering quantity, that is, the difference of the present steering angle $\theta p$ from the average steering angle $\theta av(n-1)$ one sampling time period ago. When the absolute value of the steering quantity is below a predetermined steering quantity $\theta th$ (for example, 90°), the determining section 94 produces an output signal.

The speed determining section 91, the steering force determining section 92 and the steering quantity determining section 94 deliver the output signals thereof to a condition determining section 95 that is an AND element. When all of the three sections 91, 92 and 94 deliver the output signals to the determining section 95, the section 95 produces an output signal to a time integrating section 96. In other words, the determining section 95 produces the output signal when the detected vehicle speed is above the predetermined value Vth, when the detected steering force is below the predetermined value Tth, and when the calculated steering quantity is below the predetermined value $\theta th$.

Figure 4:
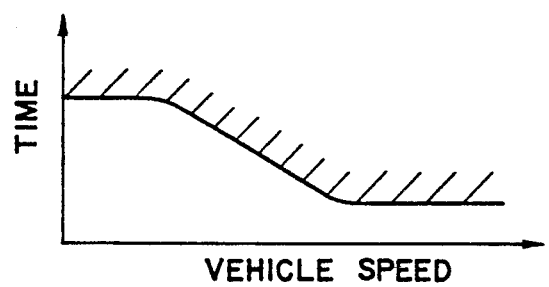
FIG. 4 is a graph indicating a change of a predetermined time.

The time integrating section 96 integrates the time during which the condition determining section 95 produces the output signal, and when the integrated time exceeds a predetermined value, the integrating section 96 delivers an output signal to an abnormality determining section 98. The predetermined value of the integrated time changes as indicated in FIG. 4, that is, the predetermined value of the time gradually decreases as the vehicle speed increases. For this purpose, the device 9 has a predetermined time setting section 10 which is connected to the vehicle speed sensor 5 to change the predetermined time to be compared with the integrated time in the section 96. It is determined that the vehicle is being driven straight ahead when there is a condition that the vehicle speed is above Vth, the steering force is below Tth and the steering quantity is below $\theta$th and when the condition stated above continues more than the predetermined time.

The abnormality detecting device 9 further includes a steering angle determining section 97. The section 97 receives the steering angle signal from the steering angle sensor 3, and when the steering angle is above a predetermined angle $\theta'$th (for example, 90°), the determining section 97 sends an output signal to the abnormality determining section 98.

When the section 97 sends the output signal to the section 98, indicating that the steering angle is above the predetermined angle $\theta'$th, in spite of the fact that the time integrating section 96 is delivering the output signal to the section 98, indicating that the vehicle is being driven straight ahead, the abnormality determining section 98 determines that there is an abnormality in the steering angle sensor 3 and produces an alarm signal, switching the system power source and the clutch device 18 off. The alarm signal is further supplied to an alarm device 100 such as an alarm lamp which is located, for example, on an instrument panel of the vehicle so as to inform the abnormality to the driver.

Figure 5:
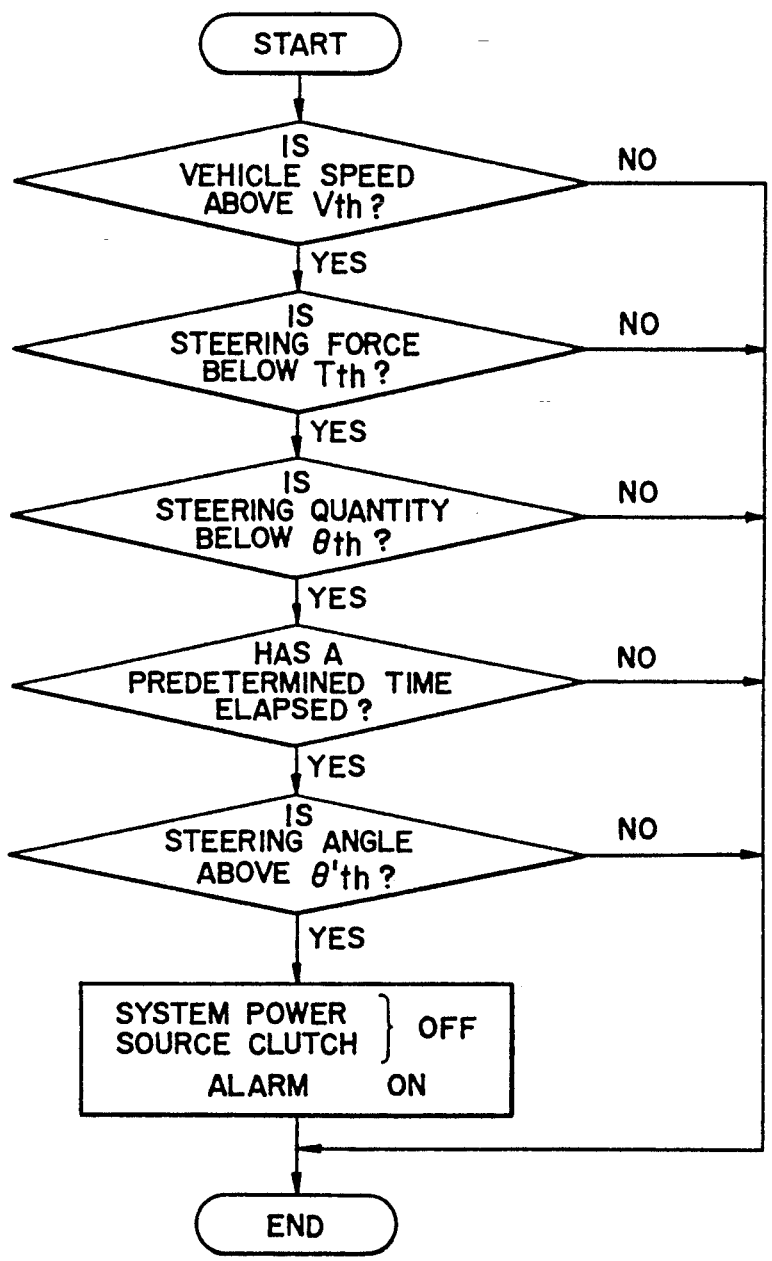
FIG. 5 is a flowchart for explaining the operation of the steering system for determining a malfunctioning according to the present invention.

The operation of the system described above is shown in the flowchart of FIG. 5.

Figure 6A:
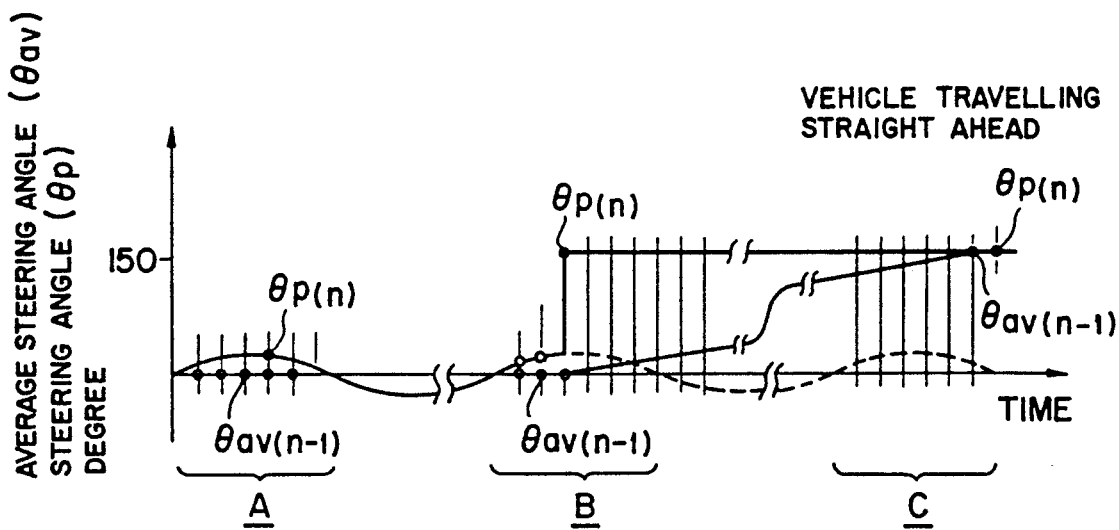
FIG. 6A is a time chart indicating variations of a steering angle and an average steering angle while a vehicle is travelling straight ahead.
Figure 6B:
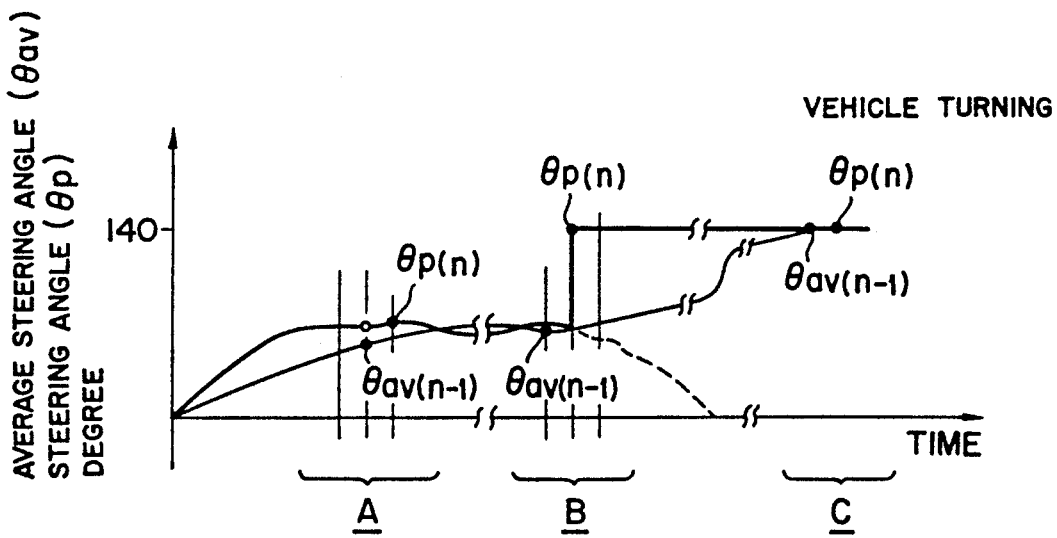
FIG. 6B is a time chart similar to FIG. 6A but showing a case in which the vehicle is making a turn.

The operation of the abnormality determining device 9 will be described below in more detail with reference to FIG. 6A and FIG. 6B showing a case of the vehicle being driven straight ahead and a case of the vehicle making a turn, respectively.

In FIG. 6A, A indicates a state in which the steering angle sensor 3 is functioning normal. As shown, the steering angle $\theta$p detected by the sensor 3 deviates slightly on both sides from the average steering angle $\theta$av taken at each sampling time due, for example, to lane changes of the vehicle on the road. In this state A, the deviation of the steering angle is ordinarily within the predetermined steering angle $\theta'$th (for example, 90°) so that no signal is inputted from the steering angle determining section 97 to the abnormality determining section 98. Therefore, the section 98 does not operate to deliver an alarm signal.

When the steering sensor 3 malfunctions and outputs a steering angle $\theta$p(n) of, for example, 150° as indicated by B in FIG. 6A, the steering angle determining section 97 determines that the steering angle $\theta$p(n) has exceeded the predetermined angle $\theta'$th and produces an output signal. However, the average steering angle $\theta$av(n−1) calculated by the average steering angle calculating section 93 one sampling time ago is not influenced by the abnormal steering angle of 150° and is 0°. Therefore, the steering quantity given by the difference of the present steering angle $\theta$p(n) from the average steering angle $\theta$av(n−1) is (150°−0°)=150°, which is more than the predetermined steering angle $\theta$th (for example, 90°). Therefore, the steering quantity determining section 94 does not produce an output signal, so that the abnormality determining section 98 does not operate.

When the steering sensor 3 continues to malfunction with the detected steering angle $\theta$p(n) maintaining the value of 150° as indicated by C in FIG. 6A, the average steering angle $\theta$av(n) calculated by the equation (1) above and outputted from the average steering angle calculating section 93 will increase gradually in proportion to the reciprocal of the constant K. Then, the average steering angle $\theta$av(n−1) one sampling time ago will reach (150°−90°)=60°. Thereafter, the steering quantity determining section 94 will produce the output signal when the steering quantity (the difference between the steering angle $\theta$p(n) and the average steering angle $\theta$av(n−1)) becomes below the predetermined value $\theta$th (90°). Therefore, when the average steering angle $\theta$av(n-1) one sampling time ago reaches 60°, the requirement of the condition determining section 95, determining the state of the vehicle moving straight ahead, is satisfied and the section 95 outputs the signal, provided that the vehicle speed is above Vth and the steering force is below Tth.

When the above state continues for a predetermined time period determined depending upon the vehicle speed as indicated in FIG. 4, the time integrating section 96 generates the output signal. Then, the abnormality determining section 98 outputs the alarm signal to produce an alarm or to cut off the power source for the power steering system and to disconnect the clutch device 18, on the basis of the signal from the steering angle determining section 97, indicating that the steering angle $\theta$p(n) is more than 90°.

While a vehicle is making a turn at a corner and so on, the steering angle $\theta$p(n) sometimes continues to be, for example, 150° for a predetermined time without the malfunction. In this case, the average steering angle $\theta$av(n) outputted from the average steering angle calculating section 93 will gradually increase with the time constant of the constant K. The steering quantity determining section 94 will not generate the output signal until the average steering angle $\theta$av(n−1) one sampling time ago reaches (150°−90°)=60°. Therefore, the condition determining section 95 will not determine that the vehicle is driven straight ahead, so that it is prevented that the abnormality determining section 98 erroneously determines malfunctioning of the steering angle sensor 3.

During a steady state turn of a vehicle, the average steering angle $\theta$av(n) outputted from the average steering angle calculating section 93 is as shown in FIG. 6A.

In this case, the steering force detected by the steering force sensor 1 is not below the predetermined steering force Tth so that the steering force determining section 92 does not output a signal. Therefore, the condition determining section 95 will not determine that the vehicle is driven straight ahead, and the abnormality determining section 98 will not make erroneous determination that the steering angle sensor 3 is malfunctioning.

FIG. 6B indicates how the steering angle $\theta$p and the average steering angle $\theta$av change in the case of malfunctioning of the steering sensor 3 during a turn of a vehicle. The only difference between FIG. 6A and FIG. 6B is that in A (the steering angle sensor 3 functioning normally) of FIG. 6A the average steering angle $\theta$av is maintained approximately zero whereas in A of FIG. 6B the average steering angle $\theta$av changes with a delay relative to the steering angle $\theta$p. B and C in FIG. 6B are the same as B and C in FIG. 6A and will not be described here. The broken line shown in FIG. 6B indicates actual steering angle steered by the driver.

The malfunctioning determining system according to the present invention can detect a defective operation of the steering angle sensor of an absolute type using a potentiometer having a relatively large output within a dynamic range thereof.

It will be understood from the foregoing that according to the present invention an erroneous determination of a malfunctioning of the steering angle sensor is avoided while a vehicle is making a turn for a short time. Moreover, an erroneous determination of a straight-ahead travel of the vehicle is avoided when the steering quantity has become smaller than a predetermined value during a steady state turn of the vehicle.

While the presently preferred embodiment of the present invention has been shown and described, it is to be understood that the disclosure is for the purpose of illustration and that various changes and modifications may be made without departing from the scope of the invention as set forth in the appended claims.

What is claimed is:

1. A device for determining a malfunctioning of an electric-motor-assisted power steering system of a motor vehicle, having an electric motor operatively coupled to the steering system, and control means responsive to a steering operation for controlling the motor so as to assist the operation of the steering system, said device comprising:
a vehicle speed sensor for detecting vehicle speed;
a steering force sensor for detecting steering force exerted by the steering operation;
a steering angle sensor for detecting steering angle;
speed determining means for producing an output signal when the vehicle speed is above a predetermined speed;
steering force determining means for producing an output signal when the steering force is below a predetermined value;
average steering angle calculating means for calculating an average steering angle in accordance with the steering angle and a last value of the average steering angle;
steering quantity determining means for calculating a steering quantity on the basis of the difference between the average steering angle and the steering angle to produce an output signal when the steering quantity is below a predetermined quantity;
condition determining means responsive to said three output signals of the speed determining means, the steering force determining means and the steering quantity determining means for generating an output signal;
time integrating means for producing an output signal indicating that the vehicle is driven straight ahead, when the output signal of the condition determining means has continued for a predetermined time;
steering angle determining means for producing an output signal when the steering angle is above a predetermined angle; and
abnormality determining means responsive to the two output signals from the time integrating means and the steering angle determining means for producing an abnormality output signal.

2. The device according to claim 1, further comprising:
predetermined time setting means responsive to the vehicle speed for gradually reducing said predetermined time as the vehicle speed increases.

3. The device according to claim 1, wherein said average steering angle calculating means calculates the average steering angle on the basis of an equation:

$$\theta av(n) = \theta av(n-1) + \frac{\theta p(n) - \theta av(n-1)}{K}$$

where $\theta av(n)$ is the average steering angle, $\theta av(n-1)$ is the last value of the average steering angle calculated one sampling time ago, $\theta p(n)$ is the steering angle detected by the steering angle sensor, and K is a constant.

4. The device according to claim 1, further comprising:
a clutch device provided to connect the electric motor to the steering system during the steering operation and to disconnect the motor from the steering system in response to the abnormality output signal.

5. The device according to claim 1, further comprising:
an alarm device provided to warn of a malfunctioning of the steering angle sensor in response to the abnormality output signal.

* * * * *